United States Patent [19]

Wang

[11] Patent Number: 5,243,241
[45] Date of Patent: Sep. 7, 1993

[54] TOTALLY MAGNETIC FINE TRACKING MINIATURE GALVANOMETER ACTUATOR

[75] Inventor: Cheng-hua Wang, Newton, Mass.

[73] Assignee: Digital Equipment Corporation, Maynard, Mass.

[21] Appl. No.: 494,171

[22] Filed: Mar. 15, 1990

[51] Int. Cl.$^5$ .......................... H02K 1/17; H02K 16/00
[52] U.S. Cl. ......................................... 310/36; 310/156; 310/68 R; 310/181; 310/154; 335/272; 335/222
[58] Field of Search ............... 369/44.21, 44.26, 44.38, 369/111, 110, 100, 32, 44.28, 44.14; 310/156, 36, 68 R, 181, 154; 335/272, 222

[56] References Cited

U.S. PATENT DOCUMENTS

| | | | |
|---|---|---|---|
| 4,587,971 | 5/1986 | Stolfi et al. | 310/36 |
| 4,620,139 | 10/1986 | Egami et al. | 310/68 R |
| 4,650,307 | 3/1987 | Capobianco et al. | 335/222 |
| 4,775,812 | 10/1988 | Kitamori | 310/156 |
| 4,856,858 | 8/1989 | Koike et al. | 310/36 |
| 4,942,562 | 7/1990 | Suzuki | 369/111 |
| 4,945,330 | 7/1990 | Arita | 335/272 |
| 4,972,112 | 11/1990 | Kim | 310/181 |

Primary Examiner—Tommy Chin
Assistant Examiner—Khoi Truong
Attorney, Agent, or Firm—Arnold, White & Durkee

[57] ABSTRACT

A fine tracking miniature galvanometer actuator is used as a fine tracking positioner for a read/write head in the optical disk drive of an information storage and/or retrieval system. An efficient magnetic circuit is used in conjunction with a small and lightweight rotor design which offers high performance characteristics in terms of frequency response and sensitivity. No mechanical springs or torsion bars are necessary to maintain the rotor in a neutral or zero position. The present invention is also useful in other systems using electro-optical transducers including reflecting-type galvanometer recording systems used for producing variable-area sound tracks.

4 Claims, 5 Drawing Sheets

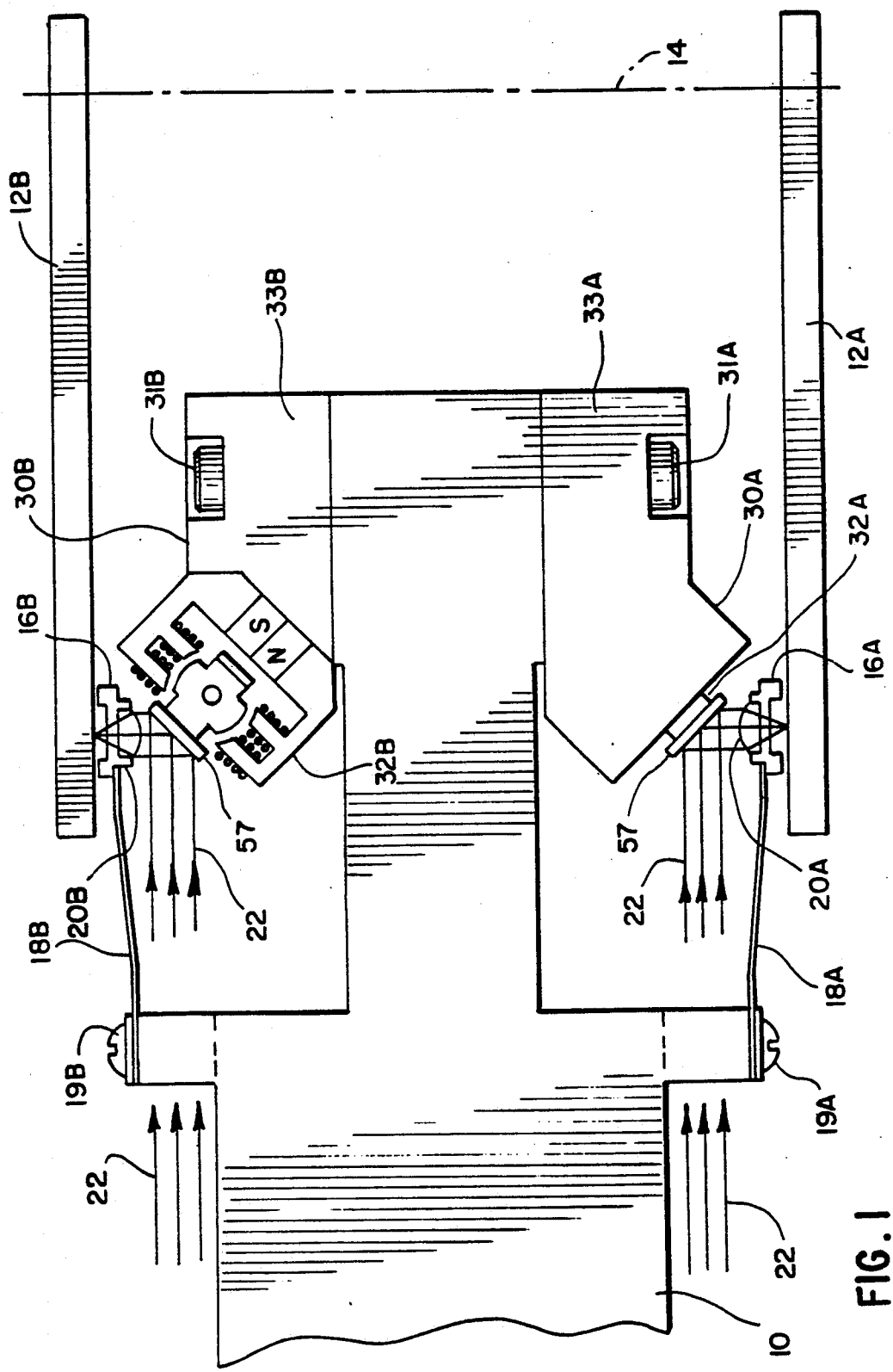

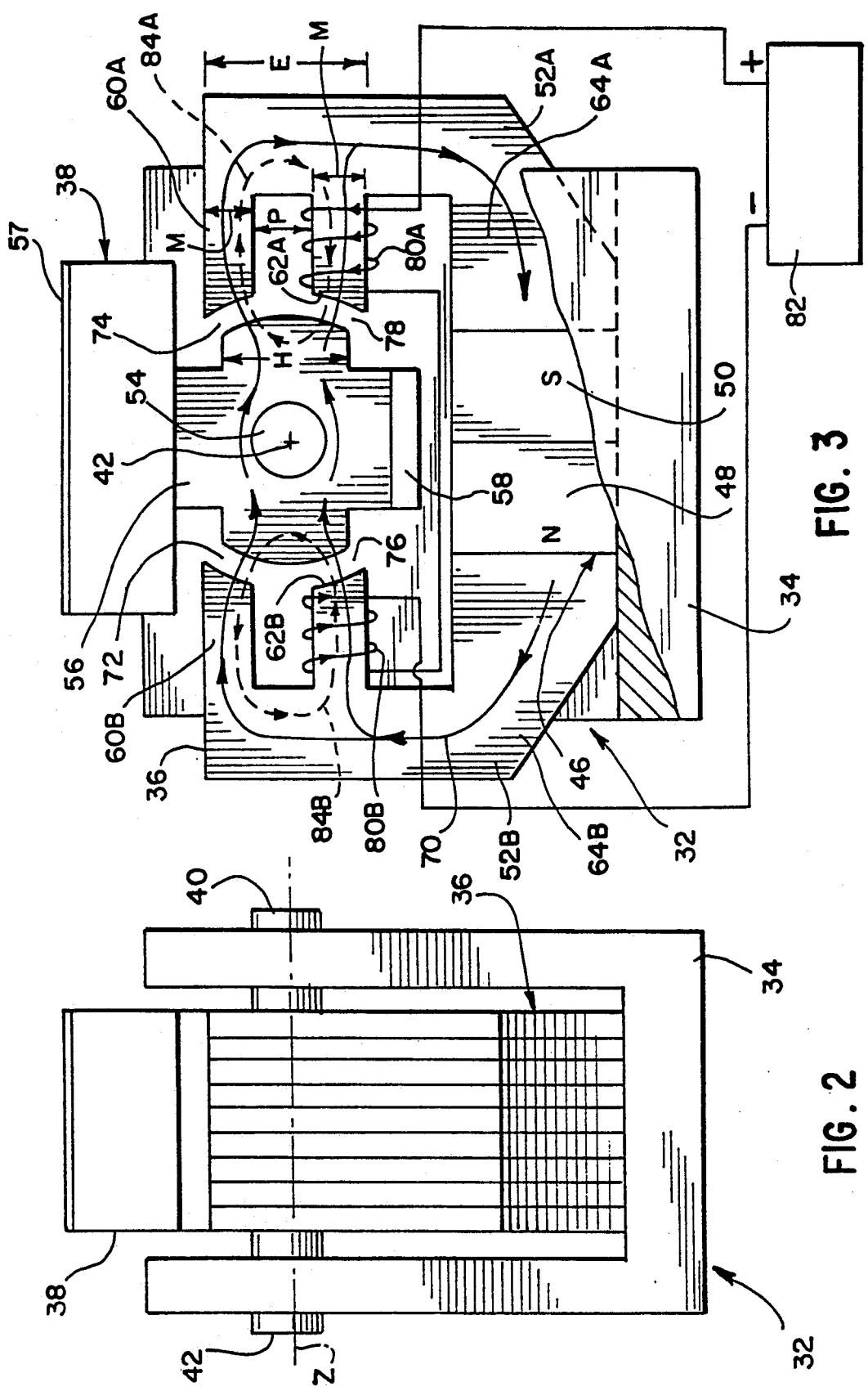

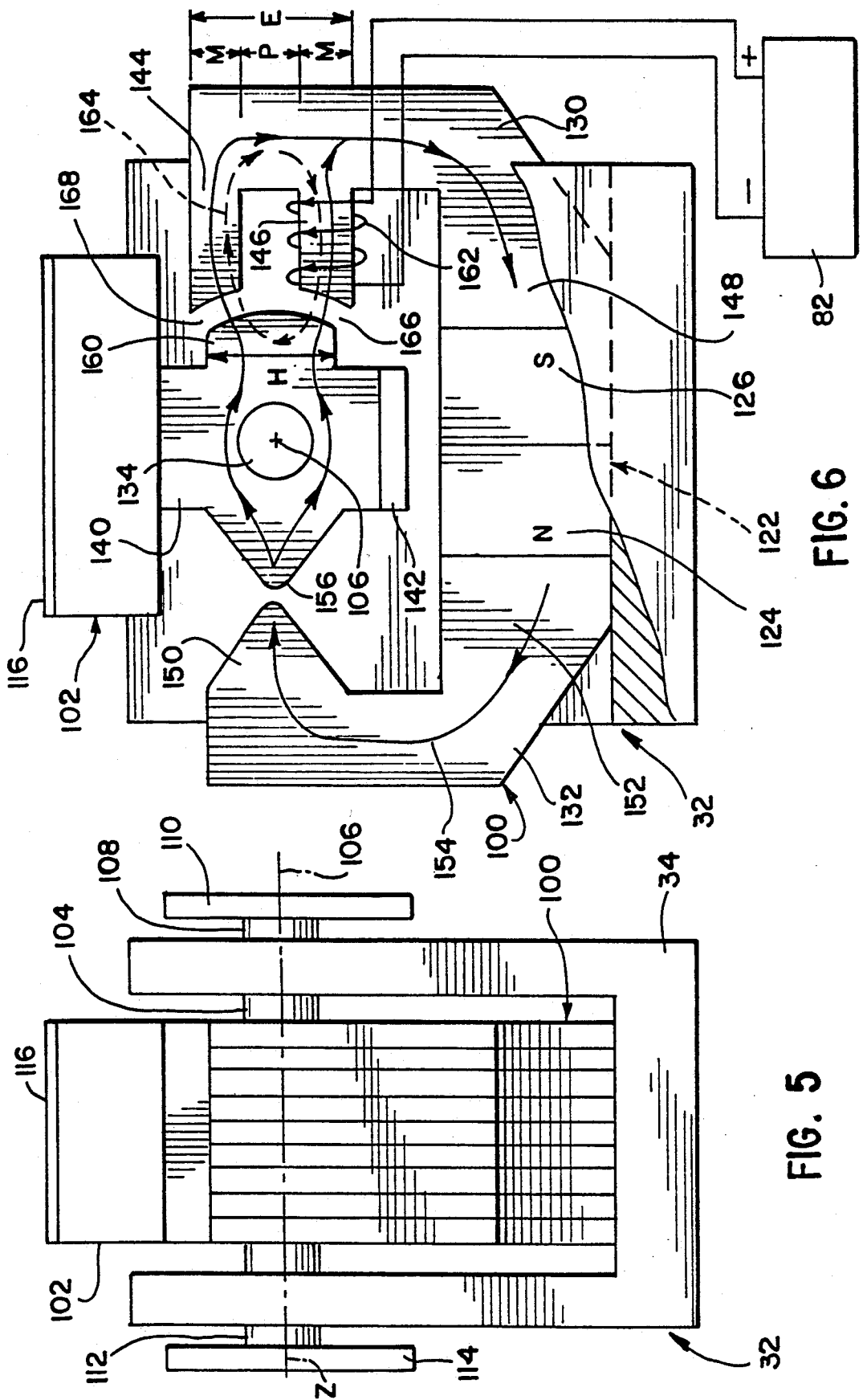

TOTALLY MAGNETIC FINE TRACKING MINIATURE GALVANOMETER ACTUATOR

FIELD OF THE INVENTION

The present invention relates to a totally magnetic fine tracking miniature galvanometer actuator for use in an information storage and/or retrieval system having an optical disk drive and in particular relates to a totally magnetic fine-tracking galvanometer actuator for use as a read/write head. The present invention is also useful in any other system using electro-optical transducers.

BACKGROUND OF THE INVENTION

Information storage and/or retrieval systems which have optical disk drives and any type of optical disk for the storage and/or retrieval of information use optical scanners for directing a laser beam or beam of light to an objective lens near the optical disk. The laser beam is used for reading information from or writing information on the disk. Optical scanners typically include a moving iron galvanometer which is used to rotate a mirror which in turn deflects the laser beam through an objective lens to the surface of an optical disk. A position transducer detects the angle of deflection of the mirror to indicate the location of the laser beam when positioned over the information tracks on the disk. In this manner, the laser beam can be accurately directed to the desired tracks of information on the surface of the disk.

One way to achieve tracking position is to direct the beam of light to the surface of the optical disk, receive the reflected light from the disk, and return the reflected beam of light to a control system which monitors the beam of light to sense tracking of the laser beam, thereby controlling the position of the optical scanner. Another method involves monitoring a feedback signal from a position transducer which senses the position of the mirror which deflects the laser beam.

Known galvanometer devices and methods use a moving coil or a moving vane and are usually big and bulky in physical size. Such devices are of a complex construction and have a poor low frequency response due to the large inertia resulting from the size of the moving parts. Because of their generally large size, these devices consume large amounts of power. In general, these known galvanometer devices employ two or more large permanent magnets which are contained within a stator. A rotor is mounted to rotate within the stator under the influence of magnetic flux which is developed by current flowing in coils. Mechanical return springs or torsion bars are used to return the rotor of these devices to a neutral position when no current is flowing in the coils. The use of mechanical springs or torsion bars introduces a resonance frequency problem which is undesirable in the servo control system.

Prior art devices, due to their comparatively large size, do not adequately provide the desired response time necessary to operate the optical disk system as efficiently as possible. In addition, the mechanical spring or torsion bar introduces low frequency resonance problems which reduce the accuracy of the positioning of the mirror.

SUMMARY OF THE INVENTION

The present invention is a totally magnetic fine tracking miniature galvanometer actuator for fine position tracking of a read/write head for use in an optical disk drive of information storage and/or retrieval systems. An optical disk drive typically includes one or more read/write heads attached to a carriage arm. The carriage arm is used to position the read/write heads above the selected tracks of an optical disk in response to a control signal. A laser or light beam is directed to the surface of a disk through an objective lens by the read/write heads.

The invention directs the laser beam to the objective lens near the optical disk for either reading information from an optical disk, or for writing information on and reading information from the disk. The invention is also useful in other electro-optical transducer systems which include for example reflecting-type galvanometer recording systems used for producing variable-area sound tracks.

The totally magnetic galvanometer actuator includes a stator, a rotor assembly, a permanent magnet, and coils or windings. When current is passed through the coils, a drive flux is developed which controls the position of the rotor assembly within the stator. A mirror or prism is mounted to the rotor or to the rotor's pivot pin in the rotor assembly. By controlling the movement of the rotor, the laser beam is directed by the mirror to an objective lens which is used to focus the laser beam on the surface of the disk.

The present invention is configured such that the actuator is a totally magnetic system which does not use any mechanical device such as a spring to return the rotor to a neutral or zero position. The present invention includes at least one pair of adjacent pole pieces or arms on one side of the stator with a coil wrapped around at least one of these pole pieces or arms. When no current passes through the coil the bias magnetic flux from the permanent magnet causes the rotor to be in a rest, neutral or zero position. When current is passed through the coil in response to the controller, a differential magnetic flux is developed in the pair of adjacent pole pieces thereby causing the rotor to move or pivot. The movement of the rotor changes the position of the mirror and the laser beam is directed through the objective lens to a different location on the optical disk. When the current from the controller ceases the rotor is returned to the rest, neutral or zero position due to the magnetic flux developed by the permanent magnet. The present invention is configured so that the individual components are relatively small when compared to prior art devices. The small and light weight rotor design and efficient magnetic circuit offers high performance in terms of frequency response and sensitivity.

Optical disk systems operate at high rates of speed, and require extremely accurate positioning systems for adjusting the location of the read/write heads. Positioning systems which finely control or adjust tracking position not only require accuracy but also require fast operation with extremely quick response times. To meet the demands for faster information storage and retrieval systems and for physically smaller systems, the entire assembly of the miniature galvanometer actuator of the present invention is reduced in size when compared to prior art systems. Because of the narrow width of the laser beam, limited space, and the required high performance response of the optical disk drive, the entire assembly of the present invention, and in particular the moving parts, is designed as small as possible yet with good performance reliability. Smaller parts have less mass and therefore less inertia which in turn permits them to react more quickly to the stimulus of a control signal.

To achieve the small size, an efficient magnetic circuit has been developed which makes possible the use of small component parts. The particular configurations of the stator and the rotor assembly, and the placement of the coils combine to provide a totally magnetic miniature galvanometer actuator having a minimum number of parts.

The rotor assembly has a center of gravity at a central axis. The stator includes at least one magpole having an adjacent pair of pole pieces or arms which create gaps between the rotor and the stator. The coils are wrapped around at least one of the arms of the magpole and when a current is passed through the coil a magnetic drive flux is developed. By controlling the magnetic flux across the gaps between the rotor and the stator, the position of the rotor can be accurately adjusted. In addition, the bias magnetic flux across the gaps between the rotor and the stator is balanced thereby absent any drive flux the rotor assembly is maintained at a null position within the stator.

The present invention does not incorporate a mechanical spring or torsion bar to maintain the rotor in a null position or to return it to its null position once the rotor has been displaced. Because of the small mass of the entire galvanometer actuator assembly coupled with the balanced bias magnetic flux across the gaps between the rotor and stator, the rotor is maintained at a zero position without the use of a mechanical return spring. The absence of a mechanical return spring solves the performance resonance frequency problem inherent in such designs and also improves system response time by eliminating any overshoot resulting from the mechanical spring.

DESCRIPTION OF THE DRAWINGS

FIG. 1 is a pictorial representation of a portion of the read/write head system in the optical disk drive including the totally magnetic fine tracking galvanometer actuator of the present invention.

FIG. 2 is an end view of the totally magnetic miniature galvanometer actuator of the present invention.

FIG. 3 is a diagrammatic view of the totally magnetic miniature galvanometer actuator of the present invention having two coils.

FIG. 5 is an end view of another embodiment of the totally magnetic miniature galvanometer actuator of the present invention having an encoder and an optional side mount mirror.

FIG. 6 is a diagrammatic view of another embodiment of the totally magnetic miniature galvanometer actuator of the present invention having an L-type magpole and one coil.

DESCRIPTION OF THE PREFERRED EMBODIMENT

Figure 4:
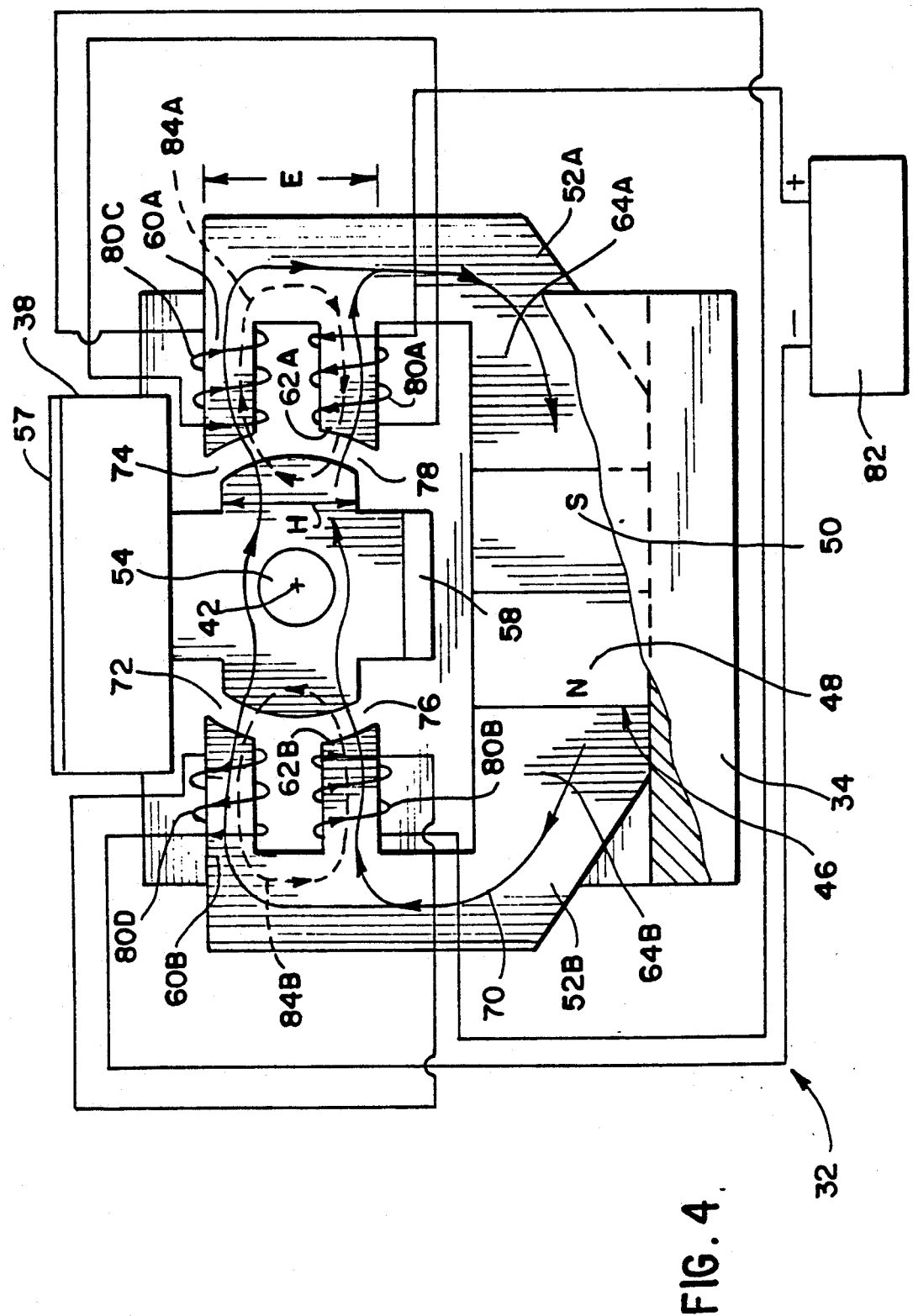
FIG. 4 is a diagrammatic view of the totally magnetic miniature galvanometer actuator of the present invention having four coils.

FIG. 1 is a pictorial representation of a portion of the read/write head system of a typical optical disk drive. A course actuator carriage arm 10 is shown positioned between an optical disk 12A and an optical disk 12B. The centerline 14 of the disks 12A and 12B is also illustrated. Attached to the course actuator carriage arm 10, is a read/write head 16A and a read/write head 16B. Each of the read/write heads 16A and 16B is connected respectively by a flexible support 18A and 18B to the course actuator carriage arm 10. Each of the flexible supports 18A and 18B is attached to the course actuator carriage arm 10 by a screw 19A and 19B respectively, of course other means of the attachment are within the ability of someone of ordinary skill in this field. When the optical disks 12A and 12B are motionless, the read/write heads 16A and 16B respectively rest on the surfaces of the optical disks 12A and 12B. When the optical disks 12A and 12B rotate, the air flow generated by the spinning disks cause the read/write heads 16A and 16B to rise from the surface of the disks 12A and 12B and float on the cushion of air.

The read/write heads 16A and 16B respectively contain lenses 20A and 20B which are used to focus a laser or light beam 22 (shown here by three parallel lines with arrows indicating the direction of the light transmitted toward the optical disk). As is well known, a stationary tower (not shown) provides the support for the laser beam apparatus and can include a prism to split a single laser beam into two laser beams for use in the read/write head system shown in FIG. 1.

Actuator assemblies 30A and 30B direct the laser beam 22 through the respective lens 20A and 20B to the surface of the disks 12A and 12B. Each of the actuator assemblies 30A and 30B is attached to the carriage arm 10 by an attachment member 31A and 31B respectively. Each actuator assembly 30A and 30B respectively includes a miniature galvanometer actuator 32A and 32B and a cover 33A and 33B. A portion of the cover 33B has been removed to more clearly illustrate the miniature galvanometer actuator 32B. The miniature galvanometer actuator 32B has a housing frame 34 (seen in FIG. 2) removed to show the placement of the actuator 32B when attached to the carriage arm 10.

FIG. 2 is an end view of the miniature galvanometer actuator 32 which includes the housing frame 34. Situated within the housing frame 34 and attached permanently thereto is a stator 36 which is described later in greater detail. Suspended within the stator 36 by a pivot pin 40 is a rotor assembly 38 (more easily seen in FIG. 3). The pivot pin 40 has a central axis 42 along a line Z. The pivot pin 40 turns freely within the housing frame 34 being supported by ball bearings or other appropriate means.

FIG. 3 is a diagrammatic view of the miniature galvanometer actuator 32 without the housing frame 34 or the pivot pin 40. The present invention includes the stator 36 which comprises a permanent magnet 46 having a North pole 48 and a South pole 50. The permanent magnet 46 can be constructed of any high energy rare-earth magnetic materials which can include ferrous materials or ceramic composites if lighter weight is desired. Attached to the permanent magnet 46 is a first magnetic pole or magpole 52A and a second magnetic pole or magpole 52 B which provides a flux path for the magnetic circuits developed within the miniature galvanometer actuator 32. Magpoles 52A and 52B are generally E-shaped. However, as shown in some of the alternative embodiments, the invention is not limited to the particular shape of the magpole except to the extent that it provides a magnetic flux path to retain and return the rotor assembly 38 to the null position and that one of the magpoles has a spaced pair of arms which enable the generation of a differential magnetic flux which is used to force the rotor 38 to move.

The rotor assembly 38 is shown positioned appropriately within the stator 36. A pivot hole 54 is appropriately centered at the central axis 42 which indicates the center of gravity of the rotor assembly 38. As previously discussed, the rotor assembly 38 rotates about the pivot pin 40 which is press fit through the pivot pin hole 54 which is formed in a rotor 56. Attached to and above the rotor 56 is a mirror or prism 57 which is used to reflect the laser beam 22 through the lens 20 of the read/write head 16 (shown in FIG. 1). Opposite the mirror 57 and attached to the rotor 56 is a counterweight 58 to establish the center of gravity of the rotor assembly 38 about the central axis 42. In the preferred embodiment tungsten is used as a counterweight because of its high density (d=19.22 gm/cc) and tungsten's nonmagnetic property. Other materials may also be used.

Each of the E-type magpole 52A and 52B respectively includes a top arm or top pole piece 60A and 60B, a middle arm or middle pole piece 62A and 62B, and a lower portion 64A and 64B. The permanent magnet 46 establishes a magnetic circuit or a permanent magnetic bias field through the arms of the E-type magpole and the rotor 56. As seen in FIG. 3, a bias flux 70 is developed by the permanent magnet 46 and travels in the direction from the north pole 48 to the south pole 50 as shown by a solid line. The bias flux 70 travels in a clockwise direction as shown, with lines of bias flux 70 flowing through each of the arms of the E-type magpoles 52. A portion of the bias flux 70 travels through the top arm 60B, across a first gap 72, through the rotor 56 above the pivot pin hole 54, across a second gap 74, and through the top arm 60A and back toward the south pole 50. Another portion of the bias flux 70 flows through the middle arm 62B across a third gap 76, through the rotor 56 below the pivot hole 54, across a fourth gap 78 and through the middle arm 62A and back to the south pole 50. The adjacent arms of each pair, namely 60A and 62A, and 60B and 62B together with the rotor 56 create adjacent pairs of gaps, namely 72 and 76, 74 and 78.

The bias flux 70 develops a magnetic circuit to maintain the rotor assembly 38 at a zero or home position which is due in part to the dimensions chosen for the rotor assembly 38, rotor 56 and each of the E-type magpoles 52. By making the dimension H of the rotor 56 less than the dimension E but greater than approximately three-quarters of the dimension E of the E-type magpole 52, the best result for maintaining the rotor assembly 38 at the zero position is maintained. If the dimension H is approximately equal to between one-half the dimension E up to and including three-quarters the dimension E, it becomes difficult for the bias flux 70 of the magnetic circuit to maintain a balanced bias flux across the four gaps and consequently makes it difficult to maintain the rotor assembly 38 at the zero position.

In the preferred embodiment, the dimension E is equal to p+2m. To obtain good performance the dimension H should be equal to or slightly larger than p+m where m is the distance across the face of any one of the top arms 60A and 60B or the middle arms 62A and 62B and p is the distance between the top arm 60 and the middle arm 62. If dimension H is equal to dimension E, close to E or greater than E the angle of rotation of the rotor assembly becomes too small for good performance. Also the dimension H should not be less than p+m or control sensitivity is lost. These are general requirements for the dimension H and the dimension E and these dimensions can be varied with resulting changes in performance.

The completed miniature galvanometer actuator 32 weighs approximately 2 grams. The small mass coupled with the balanced bias flux 70 permits the rotor assembly 36 to maintain a zero position without the use of a mechanical return spring or a torsion bar. The vertical height of the stator 36 is approximately 0.18 inches. The horizontal width across the top of the stator is approximately 0.28 inches. The rotor assembly 38 is appropriately proportioned to fit within the stator 36.

The middle arm 62A and the middle arm 62B respectively, have a first coil 80A and a second coil 80B, wound around the entire cross-section thereof. Each of the coils 80A and 80B have current flowing in the direction of the arrows. The coils 80A and 80B are connected in series as shown in FIG. 3. The current is developed by a controller 82, as is well known in the art, having the positive side thereof connected so that the current flows out of the positive side and into the negative side for purposes of FIG. 3.

Each of the coils 80A and 80B develops a drive flux 84 whose flow direction is indicated by a dashed line having arrows indicating drive flux flow direction. The drive flux 84A flows in a clockwise direction across the second gap 74 and the fourth gap 78 and through the top arm 60A and the bottom arm 62A. The drive flux 84B flows in a counterclockwise direction across the first gap 72 and the third gap 76 and through the top arm 60B and the middle arm 62B.

When the coils 80A and 80B are energized, the magnetic flux across the first gap 72 and the fourth gap 78 is reduced and the magnetic flux across the second gap 74 and the third gap 76 is increased. Consequently, adjacent pairs of gaps, for instance the first gap 72 and the third gap 76, each have one gap which has the total flux across a single gap increased and one gap which has the total flux decreased.

The increased flux at the second gap 74 and the third gap 76 forces the rotor assembly 38 to rotate in a counterclockwise direction. When the current direction in each of the coils 80A and 80B is reversed, the magnetic flux across the gaps 72, 74, 76 and 78 is also reversed from that described above, consequently the rotor assembly 38 rotates in the clockwise direction. When the current in each of the coils 80A and 80B is turned off, the rotor assembly 38 returns to the zero position due to the balanced bias flux across each of the gaps. By making the width of each of the gaps small, approximately .005 to .008 inches, a strong magnetic action is achieved which forces the rotor assembly 38 to the zero position when no current is applied to the coils 80A and 80B.

An alternative embodiment of the miniature galvanometer actuator 32 is illustrated in FIG. 4. Two additional coils 80C through 80D have been added. The third coil 80C is wound around the top arm 60A and the fourth coil 80D is wound around the top arm 60B. As before, each of the coils 80A through 80D has current flowing in the direction of the arrows when connected to the controller 82 as shown. Each of the coils 80A through 80D is connected in series so that current flows through the first coil 80A, the third coil 80C, the second coil 80B, and the fourth coil 80D. This configuration of coils produces the drive flux 84A and 84B as previously described. In this arrangement, the magnetic flux is again reduced at the first gap 72 and the fourth gap 78 and the magnetic flux across the second gap 74 and the third gap 76 is increased thereby forcing the rotor assembly 38 to rotate in a counterclockwise direction. When the current flow is reversed, the rotor assembly 38 will rotate in a clockwise direction. By turning off the controller 82, the rotor assembly 38 will return to the zero position due to the bias magnetic flux as discussed above. As before, adjacent pairs of gaps created by a single magpole interfacing with the rotor assembly have one gap with a decreased total flux crossing the gap and a second gap with an increasing total flux across the gap.

FIG. 5 is an end view of another embodiment of the miniature galvanometer actuator 32 which includes the housing frame 34. A stator 100 is permanently affixed to the housing frame 34. A rotor assembly 102 is suspended within the stator 100 by a pivot pin 104 having a central axis 106 along a line Z. As previously described, the pivot pin 102 rotates freely within the housing frame 34.

Attached to a first end 108 of the pivot pin 104 is either a mirror or prism 110 for use as one skilled in the art would understand. On a second end 112 is an encoder 114 for indicating the angular position of the rotor assembly 102. Such an encoder 114 is well known to those of ordinary skill in the field and for example could contain a Hall effect sensor which indicates the angular position of the rotor assembly 102 with respect to an established reference. Attached to the rotor assembly 102 is a mirror or prism 116 for directing the laser beam 22 to the surface of the disk 12.

FIG. 6 shows the side view of the embodiment of the miniature galvanometer actuator 32 shown in FIG. 5 absent the housing frame 34 and the pivot pin 104. This embodiment includes the stator 100 which comprises a permanent magnet 122 having a North pole 124 and a South pole 126. The permanent magnet 122 has the same characteristics as described in previous embodiments. Attached to the permanent magnet 122 is an E-type magpole 130 and an L-type magpole 132.

The rotor assembly 102 is shown positioned within the stator 100. A pivot pin hole 134 is centered around the central axis 106 which also indicates the center of gravity of the rotor assembly 102. The rotor assembly 102 includes a rotor 140, a mirror 116 attached to and above the rotor 140, and a counterweight 142 attached to and below the rotor 140. The function of the mirror 116 and the counterweight 142 are as described in previous embodiments. The E-type magpole 130 is shaped like the letter E having a top arm or top pole piece 144, a middle arm or middle pole piece 146, and a bottom arm 148. The L-type magpole 132 resembles the letter L and includes a triangular portion 150 and a bottom portion 152. The permanent magnet 122 establishes a magnetic circuit through each magpole and the rotor 140. A bias flux 154 shown by a solid line with arrows indicating bias flux flow direction travels in a clockwise direction from the North pole 124, up through the L-type magpole 132, out through the triangular portion 150, through a triangular rotor portion 156, above and below the pivot pin hole 134, through the top arm 144, a middle arm 146, and back to the South pole 126.

The bias flux 154 indicates the lines of flux developed solely by the permanent magnet 122. Because of the shape of the L-type magpole 132 and in particular the triangular portion 150 and the shape of the rotor which includes the triangular rotor portion 156 on the center of gravity around the central axis 106, the rotor assembly 102 is maintained in a zero position as shown in FIG. 6. This position is achieved by balancing the mass the triangular rotor portion 156 and the rectangular portion 160 of the rotor 140.

As in prior embodiments, the dimension E is equal to p+2m where m is the distance across the face of the top arm 144 or middle arm 146 and p is the distance between the top arm 144 and middle arm 146. Also, the dimension H of the rotor 140 must be less than the dimension E of the E-type magpole 130. However, if the dimension H is approximately equal to one-half to three-quarters the dimension E it is difficult to maintain the rotor assembly 102 at a zero position. As before, the best performance is achieved by making the dimension H equal to or slightly larger than p+m. These are general requirements for the dimension H and the dimension E and these dimensions can be varied with resulting changes in performance.

A first coil 162 is wrapped around the middle arm 146 of the E-type magpole 130. The first coil 162 is connected to the controller 82 in the manner shown so that the current flows in the direction of the arrows, from the plus side of the controller 82 and to the negative side of the controller 82. When current flows in this direction, a drive flux 164 is developed. The drive flux 164 flows clockwise in the direction shown and is illustrated by a dashed line having arrows indicating drive flux flow direction. The drive flux 164 crosses a first gap 166, into the rectangular portion 160, across a second gap 168 and into the top arm 144 of the E-type magpole 130.

When the first coil 162 is energized in this direction, the total flux at the first gap 166 is reduced and the total flux at the second gap 168 is increased. As before, an adjacent pair of gaps created by a single magpole have one gap with a decreased total flux crossing the gap and a second gap with an increased total flux crossing the gap. The increased flux at the gap 160 tends to rotate the rotor 140 in a counterclockwise direction. When the current through the first coil 162 changes direction, the rotor 140 rotates in a clockwise direction. Control of the oscillation of the rotor assembly 102 is achieved by switching the current from one direction to another. When the current is zero, the rotor assembly remains in the zero position, held by the bias flux 154. By making the width of the gaps 166 and 168 small, approximately 0.005 to 0.008 inches, strong magnetic action is achieved.

Figure 7:
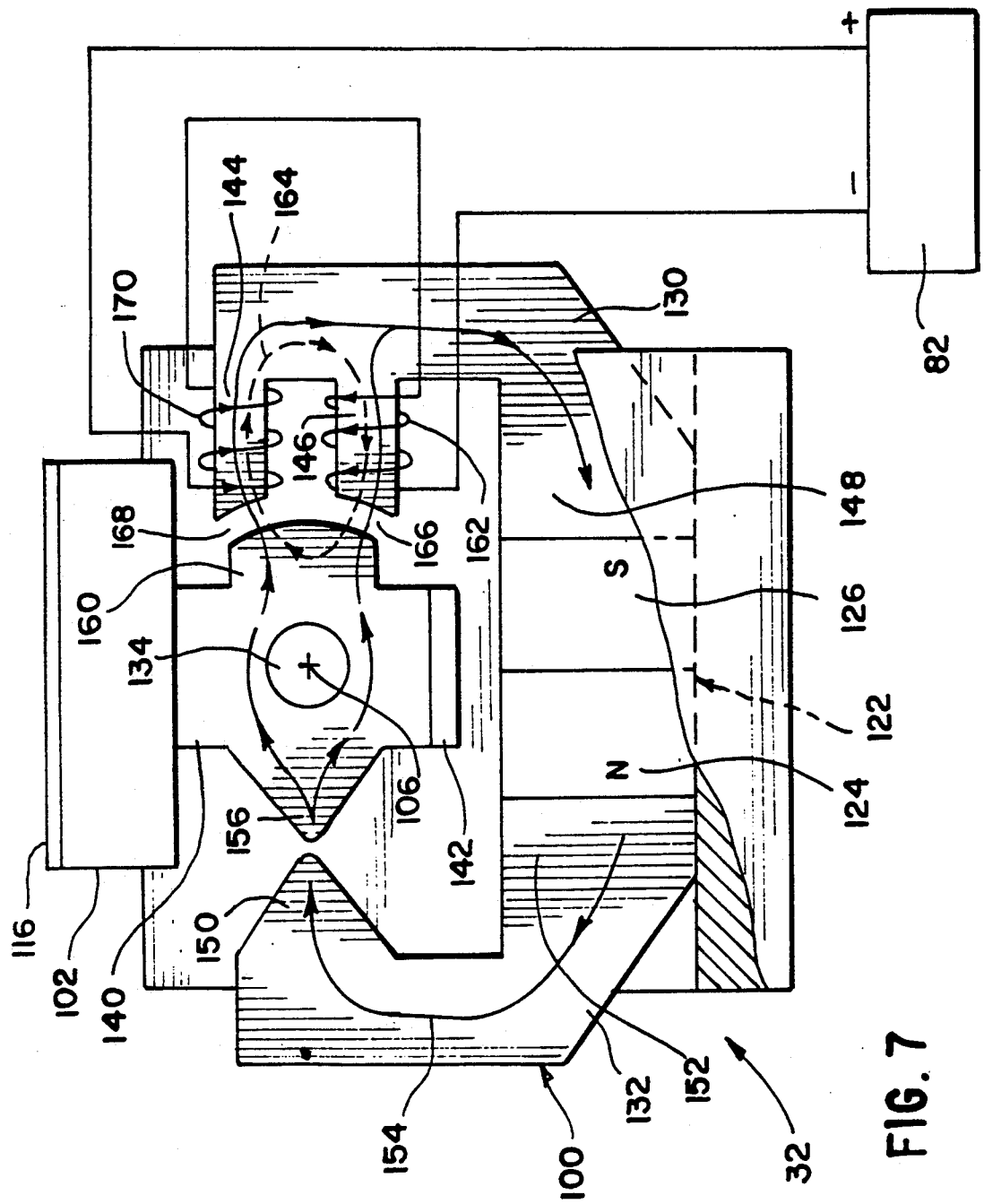
FIG. 7 is a diagrammatic view of the embodiment shown in FIG. 6 but having two coils.

FIG. 7 illustrates an alternative embodiment of the miniature galvanometer actuator 32 shown in FIG. 6. The physical construction of the stator 100 and the rotor assembly 102 are the same as described hereinbefore. This particular embodiment includes the addition of a second coil 170 wound around the top arm 144 of the E-type magpole 130. The second coil 170 has one end connected to the controller 82 as shown and is connected in series with the first coil 162.

As before, the drive flux 164 is created and flows in a clockwise direction across the first gap 166 and the second gap 168. The drive flux 164 reduces the total flux at the first gap 166 and increases the total flux at the second gap 168. Consequently, the rotor assembly 102 tends to rotate in a counterclockwise direction. Reversing the current flow through the coils 162 and 170, of course, forces the rotor assembly 102 in a clockwise direction. Position control of the rotor assembly 102 is therefore achieved.

As can be seen from each of the embodiments in FIGS. 3, 4, 6 and 7 the rotor is returned to the zero position by the balanced bias magnetic flux through the stator and rotor when the drive flux provided by the current flow from a controller or other source is removed. The right and left sides of the stator need not be symmetrical provided that their respective structure is balanced with respect to the bias magnetic flux. The drive flux produced by the current from the controller can be supplied to either or both sides of the stator to force a magnetic flux differential and consequently movement of the rotor. The relative structure and size of the stator and the rotor which forms the gaps between the two elements is selected to achieve optimum movement of the rotor under the force of the induced drive magnetic flux.

Thus, there has been described herein a totally magnetic fine tracking miniature galvanometer actuator for use in optical disk drive systems. The efficient magnetic circuit and absence of a mechanical spring or torsion bar provides high performance characteristics in terms of frequency response and sensitivity. It will be understood that various changes in the details, arrangements and configurations of parts and systems which have been herein described and illustrated in order to explain the nature of the invention may be made by those skilled in the art within the principle and scope of the invention as expressed in the appended claims.

What is claimed is:

1. A totally magnetic galvanometer actuator comprising:
   a stator comprising a permanent magnet, a triangular magpole, a second magpole having a top arm and a middle arm, said middle arm being spaced from and subtending said top arm, said permanent magnet having a North pole and a South pole for creating a bias flux through said triangular and second magpoles, said triangular magpole connected to said North pole and said second magpole connected to said South pole;
   a rotor having a central axis and a pivot about which said rotor rotates, said rotor having a zero position;
   a housing having support means for rotatably engaging said pivot, said stator being affixed to said housing, and said rotor being supported substantially within said stator by said support means and forming a first gap between said triangular magpole and said rotor and a pair of adjacent gaps between said top and middle arms of said second magpole and said rotor; and
   a first coil wound around one of said arms of said second magpole for receiving current and providing a drive flux, said drive flux causing said rotor to rotate from said zero position and said bias flux causing said rotor to return to said zero position when said drive flux is absent.

2. A totally magnetic galvanometer actuator as defined in claim 1 further comprising:
   a second coil wound around the other arm of said second magpole, said first and second coil being connected in series for receiving current and providing said drive flux.

3. A totally magnetic galvanometer actuator as defined in claim 2 wherein said rotor has a triangular portion and a rectangular portion, said triangular portion being positioned adjacent said triangular magpole and said rectangular portion positioned adjacent said second magpole.

4. A totally magnetic galvanometer actuator comprising:
   a stator comprising a first magpole having a first top arm and a first middle arm, said first middle arm being spaced a distance p from and subtending said first top arm, a second magpole having a second top arm and a second middle arm, said second middle arm being spaced said distance p from and subtending said second top arm, said top arms and said middle arms each having a face with a distance m across said face, a permanent magnet having a North pole and a South pole for creating a bias flux through said first and second magpoles, said first magpole connected to said North pole, said second magpole connected to said South pole;
   a rotor having a central axis and a pivot about which said rotor rotates, said rotor having a zero position, said rotor having a length H, wherein H is at minimum equal to p+m and at maximum less than p+2m;
   a housing having support means for rotatably engaging said pivot, said stator being affixed to said housing, and said rotor being supported substantially within said stator by said support means forming a first pair of adjacent gaps between said first top arm and said first middle arm and said rotor and a second pair of adjacent gaps between said second top arm and said second middle arm and said rotor; and
   a first coil wound around one of the arms of said first magpole and a second coil wound around one of the arms of said second magpole, said first and second coils being connected in series for receiving a current and providing a drive flux, said drive flux causing said rotor to rotate from said zero position and said bias flux causing said rotor to return to said zero position when said drive flux is absent.

* * * * *